United States Patent Office 3,299,739
Patented Jan. 24, 1967

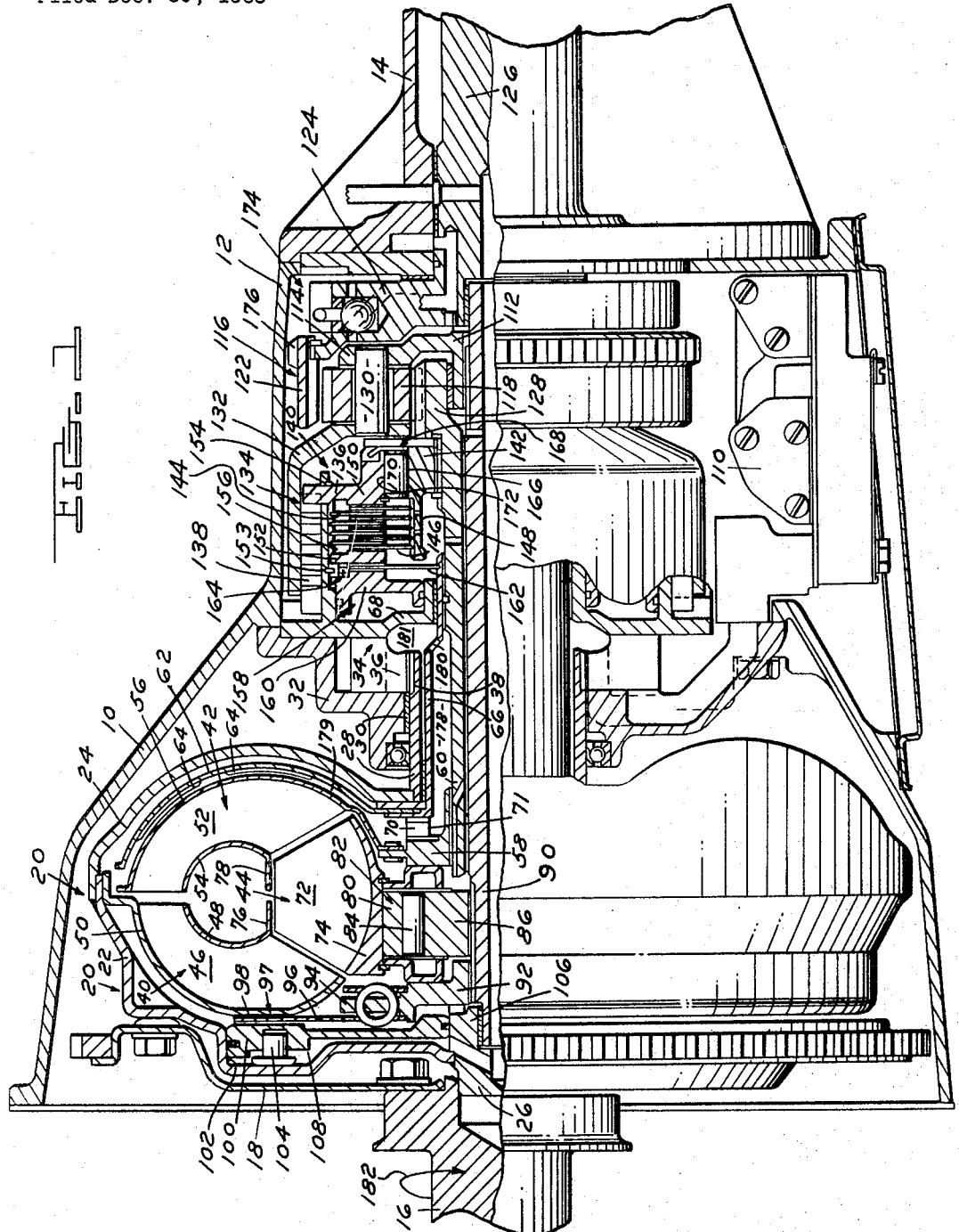

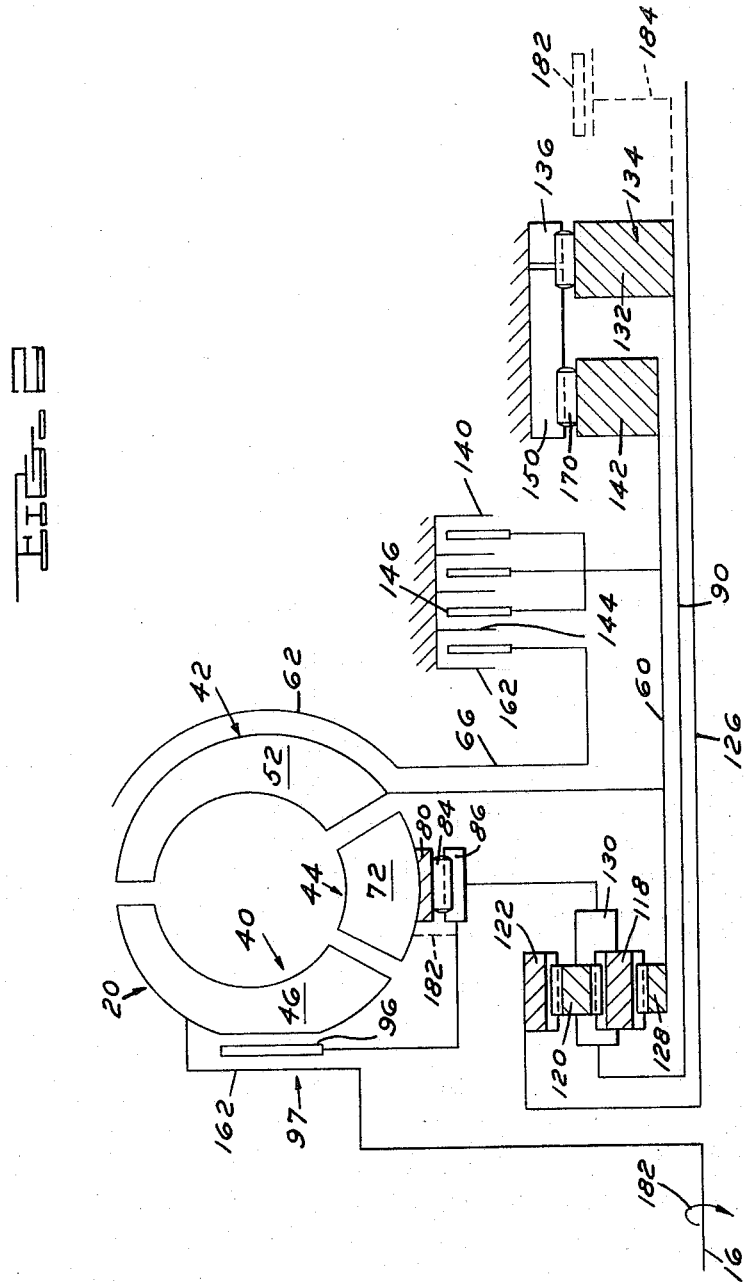

3,299,739
TRANSMISSION
Thomas R. Stockton, Northville, Mich., assignor to Ford Motor Company, Dearborn, Mich., a corporation of Delaware
Filed Dec. 30, 1963, Ser. No. 334,261
8 Claims. (Cl. 74—677)

This invention relates to a transmission construction. More particularly, it relates to one that is automatic in operation, has good operating efficiency, and provides smooth shifts between drive ranges.

One of the objects of the invention is to provide an automatic transmission that is simple in constructon, economical to manufacture, and easy to assemble or disassemble.

Another object of the invention is to combine a hydrodynamic torque transmitting device and a single planetary gear-set in a manner to provide a number of fluid or mechanical drives, or split torque combined fluid-mechanical drives.

A further object of the invention is to provide an automatic transmission of the type described in which the hydrodynamic device includes fluid scoop means for progressively scavenging the device of operating fluid and thereby providing a smooth change from a fluid drive to a pure mechanical drive through the transmission.

A still further object of the invention is to provide a transmission as described with a sequentially operated braking mechanism that automatically provides progressive braking of several members of the transmission tc provide smooth shifts between different drive ranges.

Other objects, features, and advantages of the invention will become apparent upon reference to the succeeding detailed description thereof, and to the drawings illustrating the preferred embodiments thereof; wherein, FIGURE 1 is a side elevational view, with parts broken away and in section, of one form of transmission embodying the invention; and FIGURE 2 is a schematic representation of the transmission of FIGURE 1.

FIGURE 1, which is essentially to scale, shows the details of construction of a transmission embodying the invention, while FIGURE 2 illustrates the same transmission schematically to provide a clearer picture of the overall transmission arrangement. As shown, the transmission is enclosed by a stationary housing having a forward bell-shaped portion 10 joined to a substantially cylindrical intermediate portion 12 and a tailshaft portion 14. Forward portion 10 receives the terminal end of a power input shaft 16, which is driven by any suitable source of power, such as, for example, the internal combustion engine for a motor vehicle. Shaft 16 is bolted to a conventional flywheel 18, which is drivingly secured to the shell or cover of a hydraulic torque converter 20. The shell has two portions 22 and 24 welded together, portion 22 having a hub 26 piloted within a recess in the input shaft 16. Shell portion 24 is joined to a shaft 28 rotatably and sealingly mounted within the stationary housing 32 of a fluid supply pump 34. The pump has a drive rotor 36 splined to shaft 28.

The torque converter 20 includes a pump or impeller 40, a turbine 42, and a stator-turbine 44. Impeller 40 consists of a number of circumferentially spaced blades 46 secured between inner and outer annular shrouds 48 and 50. The outer shroud 50 is secured to the converter cover portion 22 to be driven by it. The pump faces turbine 42, which is similarly constructed with spaced blades 52 secured between inner and outer annular shrouds 54 and 56. The turbine hub 58 is splined to one end of a sleeve shaft 60 for rotation thereof.

Radially spaced from and surrounding a portion of turbine 42 is an annular fluid scoop member 62 having fluid pumping or guiding fins 64. The hub of the scoop is secured to a sleeve shaft 66 rotatably supported on shaft 28 and a stationary extension 68 of the transmission housing. The scoop is rotatably separated from the turbine hub 58 by a spacer-washer 70 providing a fluid passage 71 therebetween.

The stator-turbine member 44 has a number of spaced blades 72 secured to an inner annular shroud 74. Its outer shroud is defined by axial extensions 76 and 78 of the pump and turbine shrouds 48 and 50, respectively. Inner shroud 74 is fixed to a sleeve 80 constituting the outer race of an overrunning clutch or coupling 82. This coupling is of a known mechanical type having spaced sprags or rollers 84 separating race 80 from an inner race 86 splined to a shaft 90. The coupling 82 operates in a known manner; that is, the rollers 84 wedge the races 80 and 86 together, upon rotation of stator 44 in a direction opposite to that of the pump 40, and more out of wedging position upon overrun of the stator in a clockwise direction relative to race 86.

Shaft 90 has splined to it a boss 92, which is connected through a known type of vibration damper 94 to an annular friction disc 96. Disc 96 constitutes the driven portion of a selectively operable clutch 97 for establishing a drive of shaft 90 from the power input shaft 16. The disc is located between a flat friction surface 98 on pump shroud 50 and an annular piston 100. The piston is sealingly mounted in a recess 102 defined by the pump shroud, and axially slidable on a pin 104 secured to the shroud. The admission of fluid under pressure through a bore 106 in hub 26 to the chamber 108 defined between the piston and shroud will engage the input shaft 16 and shaft 90. The clucth is disengaged by suitable spring means, not shown, upon vent of the fluid pressure from chamber 108. The bore 106 is adapted to be supplied from the fluid pump 34 through control valving contained within a housing assembly 110 in accordance to a predetermined schedule.

The opposite end of shaft 90 supports and is splined to the hub 112 of a planet carrier 114 for a gearset 116. This gearset is of the planetary type having a planet pinion 118 meshed with a second planet pinion 120 (FIGURE 2) which, in turn, drives a ring gear 122 splined to a radial extension 124 of the power output shaft 126. Pinion 118 meshes with a sun gear 128 formed on the end of turbine driven shaft 60. The pinions 118 and 120 are rotatably mounted on pinion shafts 130 secured in spaced portions of the carrier 114. The front portion of the carrier has a drum-like extension 132 constituting the outer annular race of a one-way or overrunning brake mechanism 134. Brake 134 is of the spring-applied, fluid pressure release type shown and described more clearly in FIGURE 4 in S.N. 224,715, entitled, "Transmission," Richard D. Moan, filed August 9, 1962, now Patent No. 3,209,620. It has a number of rollers, not shown, separating race 132 from an inner race 136 formed as an extension of the stationary transmission housing. The rollers are biased by springs 138 into a position wedging the races 132 and 138 together upon counterclockwise rotational tendency of race 132 relative to stationary race 136, thus preventing rotation of the carrier 114 in this direction. Rotation of the carrier in the opposite direction, i.e., clockwise, relative to the inner race 136, moves the rollers against the spring 136 to a position permitting this clockwise relative rotation of race 132. As will become clear later, it is desirable at times, such as, for example, during Reverse drive, to render this brake inoperative to permit reverse or counterclockwise rotation of race 132 relative to race 136. This is accomplished by admitting fluid under pressure to the brake to move the rollers to inoperative positions.

To establish different drives through the transmission, and smooth changes between drives, sun gear 128, and turbine 42, is adapted to be prevented from rotating in one direction alone, or in either direction. This is accomplished by means of a compound brake assembly 140. It consists of a stationary outer portion including the portion 136, and an inner rotating hub portion 142 splined to shaft 60. The outer portion 136 includes a plurality of nonrotatable friction discs 144 axially slidably splined to portion 136, and interleaved with similar friction discs 146 slidably splined to an axial extension 148 of hub 142. The disc pack is slidably mounted between end pressure plates 150 and 152 axially located between snap rings 153 and 154. The friction discs are normally separated by wave springs, not shown, and the pressure plates 152 and 150 by a compression spring 156. The left-hand portion of the stationary clutch part 136 defines an annular recess 158 slidably and sealingly receiving an annular piston 160. A friction disc 162, splined to the end of extension 66 of scoop member 62, is located between piston 160 and the backing plate 152, the three being normally separated by a wave spring 164. Fluid under pressure is admitted to chamber 158 from the control system through suitable passages, not shown.

The brake assembly 140 provides a sequential operation, initially braking the fluid scoop member 62, followed by the braking of turbine 42. That is, initially, oil at low pressure is admitted to chamber 158 moving piston 160 to engage the disc 162 with the pressure plate 152 to stop rotation of scoop tube 62. The force of spring 156 is such that, at this low oil pressure, the spring provides sufficient resistive force against plate 152 to permit engagement of the disc 162 and prevent rotation of the fluid scoop 62. The low oil pressure is insufficient to compress the spring and engage the discs 144 and 146. As the oil pressure increases, however, a point is reached where the force of spring 156 is overcome, and the entire friction brake assembly is then engaged. At this time, turbine 42 is also brought to a standstill. This sequential or progressive operation is obtained by suitable provisions in the control valving, such as, for example, an orifice feed providing a slow buildup in the fluid pressure forces acting on piston 160. It will be seen from the above, therefore, that if both the scoop member 62 and a turbine 42 are rotating, the scoop will be brought to a standstill, first, and after a slight delay, the turbine rotation will be halted.

As stated previously, the brake assembly also includes means to prevent rotation of the turbine in one direction only, when conditions call for such operation. For this purpose, the hub 142 has a portion 166 constituting the inner annular race for a one-way or overrunning brake 168. This brake is of a known mechanical type similar to the construction of clutch 82, and has spaced sprags or rollers 170 separating race 166 from an outer stationary race 172. Race 172 is formed as an extension of the stationary pressure plate 150. The brake locks up upon reverse or counterclockwise rotation of sun gear 128 and turbine 42 by rollers 170 wedging the two races together, and unlocks upon clockwise rotation of the sun gear and turbine to permit free rotation in this latter direction.

For the most part, the details of the control system have not been shown, since they are believed to be unnecessary for an understanding of the invention. However, FIGURE 1 does show a fluid pressure governor 174 driven by the output shaft 126. This governor provides a signal pressure to the control system that varies as a function of the change in vehicle speed so that shifts between drive ranges will be controlled automatically in accordance with the buildup of this signal pressure.

It should also be noted that, the ring gear 122 is provided with external cog teeth 176 adapted to be engaged by a stationary parking pawl, not shown, to provide a positive braking of the power output shaft 126.

Turning now to the operation of torque converter 20, it is adapted to be completely filled by the flow of operating fluid through the annular space 178 between the shafts 66 and 60, and the passage 179 between the turbine shroud 56 and scoop member 62. Passage or space 178 is connected via the control system to the outlet of pump 34 through a hole 180 and a manifold 181. The converter is also emptied through this same path, when desired, as controlled by a suitable valve in the control system, not shown, alternately movable between fluid supply, passage closed, and fluid vent positions. When filled, the inner and outer shrouds of the pump 40, turbine 42, and stator member 44 together define a toroidal path for the circulation of fluid between the pump and the turbine in a known manner to multiply the torque at low turbine speeds, while merely transmitting the torque without multiplication at higher turbine speeds.

The fluid scoop member 62 is used to scavenge the operating fluid from the converter. When the converter is filled, the control valve is closed, and the scoop member 62, which is freely rotatable, is carried around with the turbine substantially at turbine speed due to the fluid reaction between the shroud 56 and the scoop. The fluid filled condition provides a fluid drive of the gearset during certain phases of operation, such as First and Third speed drives and Reverse. The converter is emptied to permit establishment of other drives, such as Intermediate speed.

When the control system signals for emptying the converter, the fluid control valve moves to permit an ejection of the operating fluid from the converter to the fluid sump, and, simultaneously, oil is supplied to trigger the brake assembly 140 for a first stage of operation to brake the rotation of the scoop member 62. Relative rotation between the turbine and stationary scoop member then causes the converter to be partially emptied by fluid being pumped out of the converter to the sump through the passages 179 and 178; that is, the centrifugal head on the rotating mass of operating fluid in the converter forces the fluid through the passage 179. The converter then begins losing its torque transmitting capacity, and the turbine begins to slow down. Subsequent complete braking of the turbine by full engagement of brake 140 will then completely empty the converter.

When it is desired to fill the converter, brake 140 is released, and the control valve is moved to a position closing the converter exhaust passage, and opening manifold 181 to the fluid supply from pump 34. The pump 40 then again rotates the turbine and scoop members together.

For a quicker understanding of the complete operation, it should be noted that the clutch 97 is used in connection with the establishment of Intermediate and High speed drive, the torque converter 20 is filled for Low and High and Reverse speed operations, the brake 140 is used when establishing Intermediate speed drive and Reverse, as well as Hill Brake condition, the one-way brake 168 is used for intermediate speed operation, and the brake 134 for Low speed.

In operation, Neutral is established by emptying the converter of operating fluid, and disengaging clutch 97 and brake assembly 140. No drive is transmitted from the impeller or pump 40 to the remaining portions of the transmission.

First or Low speed operation is obtained merely by filling the converter through passages 178, 179, the one-way brake 134 being spring biased to an operative position. Once filled, the control valve is closed. Forward or clockwise rotation of input shaft 16 in the direction of arrow 182 rotates the pump and turbine members 40 and 42 in the same direction, causing stator 44 to attempt to rotate in an opposite direction. This rotation, however, is prevented by the engagement of one-way clutch 82 and brake 134. The stator is thus held stationary to provide torque multiplication through the converter in a known manner. The forward rotation of turbine 42 drives sun gear 128 in the same direction to attempt to rotate ring gear 122 in the same direction. The initial resistance to movement of the output shaft 126, due to the load impressed thereon, then attempts to cause the pinions 120 to rotate the carrier in a reverse direction; however, the rotation is prevented by the one-way brake 134. The ring gear is thus forced to rotate clockwise to drive the output shaft 126 in the same direction, and at a speed reduced from that of shaft 16.

When the control system indicates that a change from Low speed to Intermediate speed operation should be made, oil is supplied to move piston 160 to stop the rotation of scoop member 62, simultaneous with the connection of the converter operating chamber to the fluid sump. Immediately, the relative rotation between the turbine and stationary scoop member partially empties the converter, causing it to lose its capacity to transmit torque. The turbine and sun gear 128 then slow down. In timed relationship, clutch 97 is engaged to begin to rotate carrier 114 off the one-way brake 134 in a clockwise direction. As the carrier begins rotating, the torque on the pinions 118 begins to reverse the direction of torque application to sun gear 128. The moment the sun gear changes from a clockwise to a counterclockwise rotation, the one-way brake 168 engages to hold the sun gear stationary, and render it a reaction member. Also, the oil pressure acting against piston 160 is building up so that the brake 140 now begins to fully engage, thereby braking turbine 42. The converter now empties completely, breaking the torque line from the turbine to the sun gear. The transmission is now in Intermediate drive. The ring gear is then carried around by the pinions 120, and output shaft 126 now begins to rotate at a speed faster than that during Low speed operation. The drive during this stage of operation is a pure mechanical one, from shaft 16 through clutch 97 to shaft 90 and carrier 114.

It will be seen, therefore, that the change between Low and Intermediate speed operation is accomplished automatically and smoothly by the pickup shift provided by the braking of the scoop member and operation of the one-way brake 168, followed by the full engagement of the brake 140.

When the control system dictates that High speed or Direct drive should be established, the converter fluid control valve is moved to fill the converter and block its connection to the sump. The brake 140 is fully disengaged to permit rotation of the turbine 42 and scoop member 62. The clutch 97 remains engaged. The converter begins operating and quickly passes through its torque multiplying operation to its fluid coupling stage to transmit the torque of the input shaft to both the sun gear 128 and carrier 114. Thus, both the carrier and sun gear are rotating substantially at engine speeds, providing a lockup of the gearset to establish a split torque fluid-mechanical drive of the output shaft 126 substantially at the speed of input shaft 16.

To establish Reverse drive, clutch 97 is released, converter 20 is filled with fluid and the control valve closed, brake 140 is fully applied to prevent rotation of both scoop 62 and turbine 42, and fluid pressure is admitted to brake 134 to render it inoperative. Clockwise rotation of input shaft 10 drives the pump 40 in the same direction. With the turbine 42 stationary, the fluid discharged from its blades strikes the backs of the stator blades 72 to rotate them in a counterclockwise or reverse direction. Clutch 82 engages to drive the carrier 114 in the same direction, this being permitted by the inoperativeness of one-way brake 134. With the sun gear 128 as a reaction member, the ring gear 122 and output shaft 126 are driven in a direction opposite to that of the input shaft 16, and at a speed reduced from that of shaft 16.

FIGURE 2 shows, in dotted lines, an optional arrangement for the transmission of FIGURE 1. This consists of connecting the stator-turbine 44 directly to the Intermediate and High speed clutch disc 96 and carrier 114 by the dotted line connection 182, thereby eliminating the overrunning clutch 82 between the stator 44 and the carrier. With this change, the low speed one-way brake 134 is also changed, as indicated by the dotted line 184 connecting the carrier to a selectively engageable fluid pressure actuated brake band 186. This band, when applied, prevents rotation of the stator and carrier in either direction, and is released to permit counterclockwise rotation to establish a Reverse drive. In all other respects, the transmission would operate and function in the same manner as described in connection with FIGURE 1.

While the invention has been illustrated in its preferred embodiments in the drawings, it will be clear to those skilled in the arts to which the invention applies that many changes and modifications may be made thereto without departing from the scope of the invention.

I claim:
1. A transmission comprising, power input and output shafts, a fluid drive device of the fill and empty type having a plurality of rotatable elements one of which is connected to said input shaft, a planetary gearset having rotatable members at least one of which is connected to said output shaft, means for driving a second of said members from another element of said drive device when filled while holding a third of said members stationary to establish one drive, means connecting said third member to said input shaft while holding said second member stationary when said device is emptied of fluid to establish another drive, and means for driving said third member from said input shaft of said drive device while holding said another element and second member stationary during a filled condition of said drive device to provide a third drive to said output shaft.

2. A transmission comprising, power input and output shafts, a hydraulic torque converter having fluid filled and emptied conditions of operation and having a pump and a plurality of turbines, a planetary gearset having meshing sun and ring and pinion gears and a planet carrier, means connecting said input shaft to said pump and said ring gear to said output shaft, means connecting one of said turbines to said sun gear and a second turbine to said carrier, fluid scoop means fluid driven at times by said one turbine and mounted for a relative rotation therebetween, means for holding said carrier and second turbine against rotation in one direction to establish one drive to said output shaft from said input shaft in the filled condition of said converter, sequentially operated brake means for initially braking said scoop means to scavenge said converter of fluid and subsequently prevent rotation of said first turbine and sun gear to condition said gearset for another drive, and means connecting said input shaft and carrier to provide said another drive.

3. A transmission comprising, a forwardly rotating power input shaft and an output shaft, a hydraulic torque converter device of the fill and empty type driven by said input shaft and having a pump, a turbine, and a turbo-stator, a planetary gearset having a planet gear carrier and planet gears meshing with a sun gear and a ring gear, means connecting said ring gear to said output shaft, means for driving said sun gear from said turbine when said device is filled while holding said carrier and turbo-stator stationary to establish one forward drive, means to drive said carrier by said input shaft while holding said sun gear stationary when said device is emptied of fluid to establish another forward drive, rotatable fluid scoop means fluid driven by said turbine and mounted for a relative rotation therebetween, and means to sequentially brake the rotation of said scoop means and turbine to empty the fluid from said device.

4. A transmission comprising, a forwardly rotating power input shaft and an output shaft, a hydraulic torque converter device of the fill and empty type driven by said input shaft and having a pump, a turbine, and a turbo-stator, a planetary gearset having a planet gear carrier and planet gears meshing with a sun gear and a ring gear, means connecting said ring gear to said output shaft, means for driving said sun gear from said turbine when said device is filled while holding said carrier and turbo-stator stationary to establish one forward drive, means to drive said carrier by said input shaft while holding said sun gear stationary when said device is emptied of fluid to establish another forward drive, rotatable fluid scoop means fluid driven by said turbine and mounted for a relative rotation therebetween, first means to brake the rotation of said scoop means to partially empty the fluid from said device, and second means actuated subsequent to the braking of said scoop means to brake said turbine and completely empty said device.

5. A transmission having power input and output shafts, and means connecting said shafts providing a plurality of drives therebetween, said means including a planetary gearset and a hydraulic torque converter drive device having a pump, turbine and turbo-stator, said gearset having a planet gear carrier and planet gears meshing with a sun gear and a ring gear, said drive device having fluid filled and emptied conditions of operation to transmit or interrupt the transmission of torque therethrough, means connecting said input shaft to said pump and said turbine to one of said sun and ring gears, means connecting the other of said sun and ring gears to said output shaft, fluid scoop means fluid driven by said turbine and mounted for a relative rotation at times therebetween, means for holding said carrier and turbo-stator stationary to condition said gearset for one drive during a filled condition of said drive device, engageable means for braking the rotation of said scoop means for scavenging fluid from said drive device, other brake means for holding said one turbine against rotation in one direction during the empty condition of operation of said drive device to condition said gearset for another drive therethrough, and disengageable means for connecting said input shaft and said carrier to provide said other drive.

6. A transmission having power input and output shafts, and means connecting said shafts providing a plurality of drives therebetween, said means including a planetary gearset and a hydraulic torque converter drive device having a pump, turbine and turbo-stator, said gearset having a planet gear carrier and planet gears meshing with a sun gear and a ring gear, said drive device having fluid filled and emptied conditions of operation to transmit or interrupt the transmission of torque therethrough, means connecting said input shaft to said pump and said turbine to one of said sun and ring gears, means connecting the other of said sun and ring gears to said output shaft, fluid scoop means fluid driven by said turbine and mounted for a relative rotation at times therebetween, means for holding said carrier and turbo-stator stationary to condition said gearset for one drive during a filled condition of said drive device, sequentially engageable brake means for initially braking the rotation of said scoop means for scavenging fluid from said drive device, and subsequently holding said turbine against rotation to condition said gearset for another drive therethrough, and means for connecting said input shaft and said carrier to provide said other drive.

7. A transmission having power input and output shafts, and means connecting said shafts providing a number of drives therebetween, said means including a planetary gearset having a planet gear carrier and planet gears meshing with a sun gear and a ring gear, said means also including a hydraulic torque converter drive device having a pump, turbine and turbo-stator and having fluid filled and emptied conditions of operation for transmitting or terminating the transfer of torque therethrough, means connecting said pump to said input shaft and said turbine and turbo-stator respectively to said sun gear and carrier, means connecting said ring gear to said output shaft, fluid scoop means rotatably mounted with respect to said turbine during a filled condition of said device establishing one drive to said gearset, selectively operable brake means having a plurality of stages of operation, the operating of said brake means during one stage holding said scoop means stationary to scavenge fluid from said drive device to partially terminate said one drive, the operation of said brake means during a second stage holding said scoop means and said turbine stationary to empty said device and condition said gearset for another drive.

8. A transmission comprising, power input and output shafts, a hydraulic torque converter having fluid filled and emptied conditions of operation and having a pump, a turbine, and a turbo-stator, a planetary gearset having meshing sun and ring and pinion gears and a planet carrier, means connecting said input shaft to said pump and said ring gear to said output shaft, means connecting said turbine to said sun gear, overrunning coupling means connecting said turbo-stator to said carrier, fluid scoop means fluid driven at times by said turbine and mounted for a relative rotation therebetween, overrunning brake means for holding said carrier and turbo-stator against rotation in one direction upon engagement of said overrunning coupling means to establish one drive to said output shaft from said input shaft in the filled condition of said converter, sequentially and progressively operated disengageable friction brake means when initially engaged braking said scoop means to scavenge said converter of fluid and upon subsequent progressive engagement prevent rotation of said first turbine and sun gear to condition said gearset for another drive upon rotation of said carrier, and disengageable clutch means connecting said input shaft and carrier to provide said another drive.

References Cited by the Examiner

UNITED STATES PATENTS

| | | | |
|---|---|---|---|
| 2,351,213 | 6/1944 | James | 74—763 |
| 2,352,004 | 6/1944 | Pollard | 74—677 |
| 2,437,333 | 3/1948 | Pollard | 74—677 |
| 2,627,166 | 2/1953 | Becker | 60—54 |
| 2,664,705 | 1/1954 | Becker | 60—54 |
| 2,725,762 | 12/1955 | Hettinger et al. | 74—763 |
| 2,890,600 | 6/1959 | Smirl et al. | 74—677 |
| 2,908,190 | 10/1959 | Hause | 74—677 |
| 2,968,197 | 1/1961 | De Lorean | 74—677 |
| 3,075,408 | 1/1963 | Chapman et al. | 74—677 |
| 3,106,107 | 10/1963 | Hardy | 74—688 |
| 3,233,478 | 2/1966 | General et al. | 74—763 |

DAVID J. WILLIAMOWSKY, *Primary Examiner.*

THOMAS C. PERRY, *Examiner.*